United States Patent [19]

Kirven

[11] Patent Number: 4,689,892

[45] Date of Patent: Sep. 1, 1987

[54] APPARATUS AND METHOD OF MEASURING SURFACE HEIGHTS

[75] Inventor: Thomas Kirven, Pomona, Calif.

[73] Assignee: Kalman Floor Company, Evergreen, Colo.

[21] Appl. No.: 745,504

[22] Filed: Jun. 17, 1985

[51] Int. Cl.⁴ .............................................. G01B 7/28
[52] U.S. Cl. ..................................... 33/533; 33/1 BB; 73/146
[58] Field of Search ................... 33/533, 1 BB, 141.5, 33/142; 73/146

[56] References Cited

U.S. PATENT DOCUMENTS

| | | |
|---|---|---|
| 811,739 | 2/1906 | Pelfrey . |
| 1,829,257 | 10/1931 | Best . |
| 1,967,758 | 7/1934 | Pierce . |
| 2,316,951 | 4/1943 | Grauer . |
| 3,056,209 | 10/1962 | Oliver . |
| 3,208,151 | 9/1965 | Rawstron . |
| 3,222,787 | 12/1965 | Young . |
| 3,459,038 | 8/1969 | Swift ..................................... 73/146 |
| 3,462,845 | 8/1969 | Matthews . |
| 3,470,739 | 10/1969 | Hideo Takafuji et al. . |
| 3,475,954 | 11/1969 | Cook ..................................... 73/146 |
| 3,639,993 | 2/1972 | Sartorio . |
| 3,675,545 | 7/1972 | Anderson . |
| 3,816,937 | 6/1974 | Burgin . |
| 3,835,546 | 9/1974 | Jaquet . |
| 3,887,012 | 6/1975 | Scholl . |
| 3,896,665 | 7/1975 | Goel ..................................... 73/146 |
| 3,940,855 | 3/1976 | Ver Nooy . |
| 4,133,072 | 1/1979 | Face, Jr. . |
| 4,137,638 | 2/1979 | Watts ................................. 33/141.5 |
| 4,274,205 | 6/1981 | Starr . |
| 4,434,558 | 3/1984 | Face, Jr. et al. ...................... 33/533 |
| 4,471,530 | 9/1984 | Kirven . |

FOREIGN PATENT DOCUMENTS 1590017 7/1977 United Kingdom ............... 33/1 BB

Primary Examiner—William D. Martin, Jr.
Attorney, Agent, or Firm—Stetina & Brunda

[57] ABSTRACT

This invention relates to apparatus and methods for measuring height variations on a floor surface to test for floor flatness sufficient for automated high level warehousing applications. An inclinometer mounted on a trolley set to follow a reference line produces signals indicative of the floor profile. A computer samples the sensor output at selected intervals and calculates floor height at the data points relative to a reference level. The floor profile data may be stored for subsequent use or it may be printed to form a plot or graph of the floor profile along the reference line.

15 Claims, 8 Drawing Figures

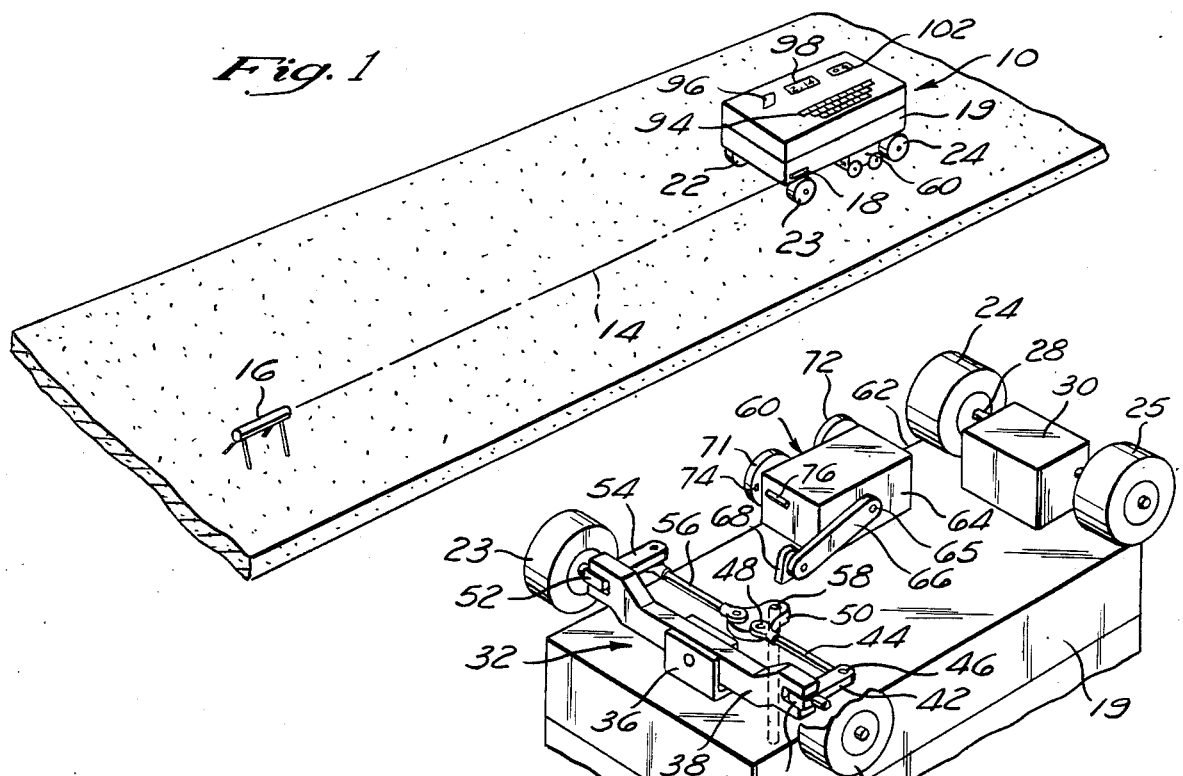
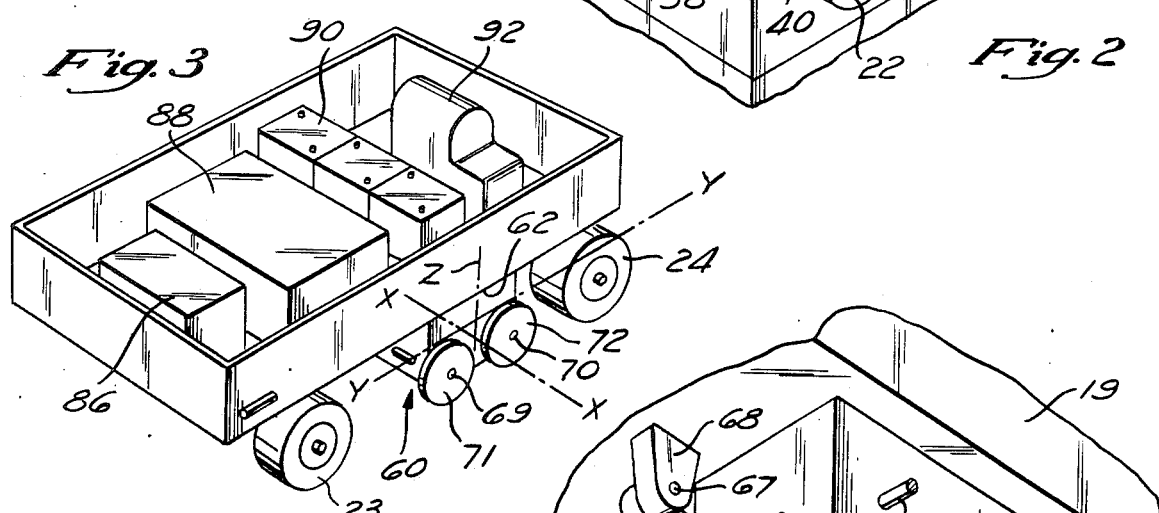
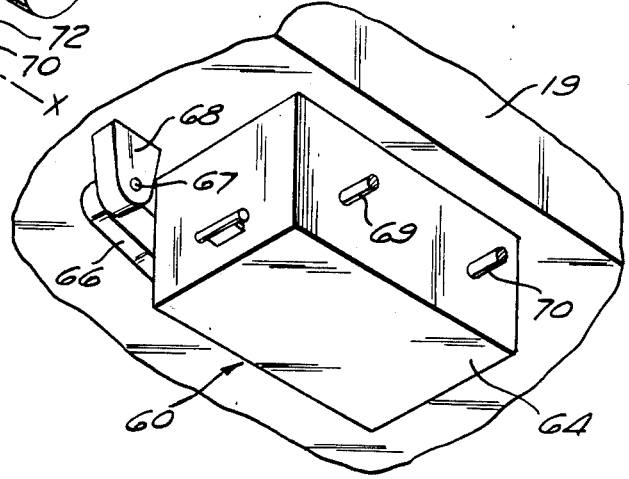
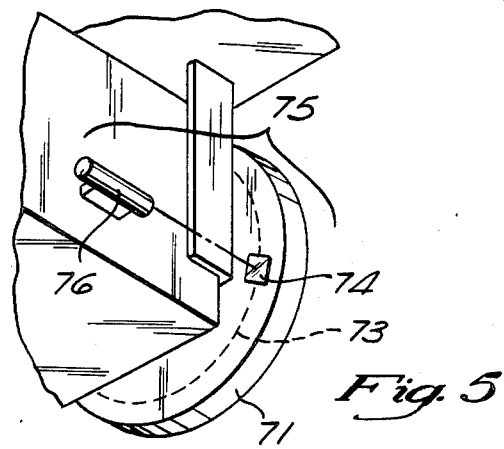

APPARATUS AND METHOD OF MEASURING SURFACE HEIGHTS

BACKGROUND OF THE INVENTION

The present invention relates generally to surface gauges and particularly to an improved apparatus and method for measuring surfaces to detect irregularities. Still more particularly, this invention relates to apparatus and methods for measuring concrete floors to determine their suitability for use in automated warehouse applications.

In recent years, the concrete floor industry has experienced an increasing demand for extremely flat floors (genericly known as superflat floors) suitable for automated high level warehousing applications. Floor surface height deviations often cause vibrational damage to automated fork and turret trucks traveling upon the floor and reduce the productivity of stacking cranes installed within the warehouse. To meet this increasing demand, the industry is currently attempting to adopt standards and specifications for floor flatness and establish apparatus and methods suitable for measuring floor flatness to ensure compliance with such existing and future standards.

Heretofore, three basic categories of prior art apparatus and methods for measuring floor flatness have been utilized in the art, i.e. manual systems, semi-automatic systems and fully automatic systems.

The manual systems have typically comprised either an engineer's level and rod apparatus or a level straight edge with a sliding dial gauge mounted at right angles to the straight edge. Floor measurements indicated on the rod or from the dial gauge could be obtained and manually plotted. The more recent semi-automatic systems have generally comprised apparatus having a pair of spaced wheels adapted to travel along a selective path of a concrete floor surface and including a sensor adapted to measure the height differential between the two wheels along the concrete floor. Examples of such prior art semi-automatic systems are the Analog Profileograph apparatus manufactured by Edward W. Face Company and an analog measuring apparatus manufactured by Mr. Ralph McLean of Fullerton, California. Although such prior art manual and semi-automatic measuring systems have proven generally effective in the past, they possess inherent deficiencies which detract from their overall effectiveness and widespread use in the industry.

The foremost deficiency of the manual prior art systems have been the extreme labor intensiveness of conducting measurements, often requiring a pair of skilled surveyors to be maintained upon the job site for prolonged durations. Further, such manual systems although providing a true height reading along the floor surface, have necessitated the accumulation of height readings at only selected locations on the floor surface, with later interpolation of the measurement data to derive a height profile for the entire surface area of the floor. As will be recognized, such interpolation inherently introduces inaccuracies into the measurement results, which in superflat floor applications is oftentimes unacceptable.

The prior art semi-automatic systems, although typically not requiring significant interpolation of data results, have proven to be extremely expensive and, further, have additionally required skilled operating technicians to be utilized upon the job site. Further, such semi-automatic systems have heretofore failed to provide a true height profile of the floor surface, but rather have only yielded a relative height differential throughout the surface area of the floor. In addition, current semi-automatic devices pose many anomalies associated with the data representation of absolute surface heights and many such systems have failed to permit the slope or level measurements of the floor to be determined.

A recent semi-automatic sensor beam device comprises a rigid beam supported upon the measurement surface at oppostie ends and includes means to permit the rapid leveling of the beam into a level horizontal plane or axis. A height sensor is carried for transport along the beam and is adapted to contact the measurement surface. The sensor and transport mechanism generate height and position signals which may be processed by a microprocessor and printed or plotted to yield a true height profile of the measurement surface throughout the length of the beam.

A recent automatic single axis transport trolley device comprises the use of a trolley having a pair of wheels adapted to contact and travel upon the surface to be measured. A pair of optical sensors are mounted upon servo units attached adjacent each of the contact wheels and are adapted to track an optical beam utilized to generate a reference plane, axis or datum. During travel of the trolley along the surface, variations in the surface height from the optical reference plane are detected by the optical sensors which output signals that may be similarly processed to print and plot the true height profile of the measured surface.

A recent automatic dual axis transport trolley apparatus comprises a trolley which may be transported along the length of the surface to be measured and basically combines the structure of the semi-automatic beam sensor and fully automatic single axis embodiments to permit in a step and repeat fashion, simultaneous sensing, printing, and plotting of the true surface height profile along both a transverse and longitudinal coordinate axis.

However, the recent devices, while providing satisfactory results are excessively expensive for many applications. In other applications optical beam systems lack sufficient precision to determine whether a floor meets flatness specifications.

Thus, there exists a substantial need in the art for an improved measurement apparatus and method for measuring surface heights which automatically provides accurate, true height profile and slope data for concrete floor surfaces without the need of utilizing skilled labor.

SUMMARY OF THE INVENTION

The present invention overcomes the difficulties associated with prior art devices for measuring floor surface irregularities by providing an accurate, economical apparatus and method of measuring surface heights. The invention includes a trolley which is aligned to travel a path determined by a reference line along the floor. The reference line may be formed by a reference beacon that may include a coherent light source. The trolley includes an electric constant velocity drive motor that is preferably battery powered. An inclinometer including a pair of reference wheels is mounted to the trolley by a bracket which permits the inclinometer to follow the floor profile along the reference line. The inclinometer outputs a signal indicative of the angle between the horizontal and the points of contact of the measuring wheels with the floor. The sensor output is digitized and input to a digital computer programmed to calculate the difference in floor height at selected points relative to a reference line. The inclinometer cooperates with a triggering sensor which include means for selecting equally spaced points at which the computer samples the digitized inclinometer output data.

The front wheels of the trolley are steerable under the control of a steering control mechanism, which insures that the trolley follows the predetermined reference line.

The upper portion of the trolley includes a keyboard for entering instructions and data into the computer, a printer and a magnetic tape storage device. The printer is preferably a dot matrix printer which may conveniently print out a sequence of dots to represent the height profile of the floor along the reference line.

The measuring wheels of the inclinometer are positioned closely together and the distance between points for taking measurements of the floor height are close together so that the invention provides a highly accurate representation of the floor profile.

The method of the invention includes establishing the reference line, aligning the trolley with the reference line and starting the trolley in motion along the reference lines so that the trolley attains constant velocity before reading the first point at which floor height measurements are to be taken. The inclinometer may be calibrated by having the trolley make oppositely directd runs along the reference line to determine an offset factor. The oppositely directed runs need only be for a portion or a short distance of the reference or selected line. Measurement runs are then typically made along a plurality of parallel paths along the floor. The data points taken along the various paths may be taken so as to represent a rectangular grid, a measurement being taken at each point of the grid to indicate the floor height relative to the reference line. During measurements, the computer may either accumulate the floor height data in a memory or in the magnetic tape storage device. Such floor height data comprises a great many data points taken and then reduced in the computeer to a desired number of floor elevations for subsequent plotting. As a result, it is possible to derive many elevation points of varying resolutions and spacings at any future date. Furthermore, since the data base yields true elevation data, this information can be processed by the computer to yield other forms of flatness analysis, i.e. slope plots, normalized deviations from straight lines and other floor profile data. The floor profile may be printed out by the printer during a measurement run after each measurement run, or after several measurement runs have been taken.

BRIEF DESCRIPTION OF THE DRAWINGS

FIG. 1 is a perspective view having the apparatus of the present invention on a floor surface set to follow a reference beacon to measure the surface heights on the floor along a predetermined line;

FIG. 2 is a bottom perspective view of the apparatus of the present invention showing the transport, steering, and surface height mechanisms;

FIG. 3 is a top perspective view of the apparatus showing the arrangement of components therein;

FIG. 4 is a bottom perspective view showing attachment of the height measuring mechanism to a frame;

FIG. 5 is a perspective view schematically showing means for maintaining the height measuring apparatus in alignment with a predetermined reference;

DESCRIPTION OF THE PREFERRED EMBODIMENT

Figure 6:
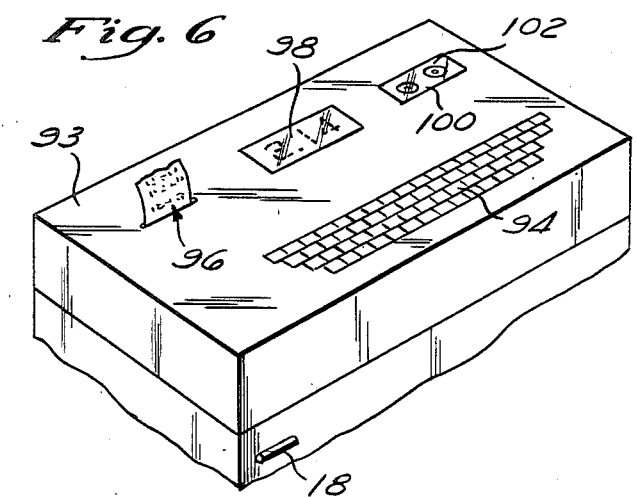
FIG. 6 is a perspective view of a key board, readout means and magnetic tape recording means included in the housing of FIG. 3.

FIG. 1 shows a trolley 10 positioned upon a floor 12, which may be made of concrete in a typical applicaiton. The trolly 10 is aligned to travel a path determined by a reference line 14, which may be formed by a variety of means such as a taut string or optical beam from a reference beacon 16 which may comprise, by way of example, a coherent light source. The trolley 10 is initally positioned so that an alignment device 18, which may comprise a photodetector or a simple sighting device is in alignment with the reference line 14 to receive a light signal from the reference beacon 16.

Referring to FIGS. 1 and 2, the trolley 10 includes a frame 19, a pair of front wheels 22, 23 and a pair of rear wheels 24, 25 mounted thereto. The rear wheels 24, 25 are rotatably mounted upon an axle 28, which passes through a drive mechanism 30, to receive a driving torque therefrom.

A steering mechanism designated generally by the numeral 32 steerably mounts the front wheels 22 and 23 to the frame 19 by way of a support bracket 36 which supports a front axle 38 in a manner to restrict roll motion for stability. A spindle 40 is pivotally mounted to one end of the front axle 38 to rotatably mount the front wheel 32. A steering arm 42 rigidly connected to the spindle 40, or integrally formed therewith, extends from the spindle 40 generally perpendicular to the front axle 38 when the wheels 22 and 23 are directed straight ahead in alignment with the longitudinal axis of the frame 19. A steering rod 44 has a first end 46 pivotally connected to the steering arm 42 and a second end 48 pivotally connected to a steering yoke 50.

The front wheel 23 is similarly rotatably mounted to a spindle 52 that is pivotally connected to the axle 38. A steering arm 54 extends from the spindle 52 and a steering rod 56 is pivotally connected between the steering arm 54 and the steering yoke 50.

The steering yoke 50 is mounted to a pivot or rotatable pin 58 which extends through the frame 19 to cooperate with the steering control mechanism 86 described hereinafter. Rotation of the pivot pin 58 and hence rotation of the steering yoke 50 transmits steering forces to the steering rods 44 and 56. The steering forces act on the steering arms 42 and 54 to produce steering torque on the spindles 40 and 52, thereby controlling the angular orientations of the axes of rotation of the front wheels 22 and 23 relative to the frame 20.

Referring to FIGS. 2 and 3, a conventional inclinometer (i.e. tilt sensor) 60 is mounted adjacent an edge 62 of the frame 19 between the front wheel 23 and the rear wheel 25. The inclinometer 60 includes a housing 64, a front measuring wheel 71 and a rear measuring wheel 72.

Referring to FIG. 4, there is shown a convenient means for mounting the housing 64 to the frame 19. The housing 64 is attached by pin 65 to connecting arm 66. The connecting arm 66 is connected by pin 67 to a tab 68 extending from frame 19. The housing 64 can independently rotate about pin 65. The arm 66 can rotate about pin 67. By this means of attachment, the housing 64 is permitted to move along the Z axis and rotate through angles about the X axis of FIG. 3, but is restrained against rotation about the Y and Z axes. Thus, the housing 64 always travels in the same direction as the trolley 10 and is free to follow the profile of the floor 12.

Referring to FIGS. 3 and 4, a pair of axles 69 and 70 mount a first measuring wheel 71 and a second measuring wheel 72, respectively, to the housing 64. Since the inclinometer 60 has the freedom to rotate about the X axis of FIG. 3, the measuring wheels 71 and 72 follow the profile of the floor 12 as the trolley 10 moves along the reference line 14. Thus, the elevations of the measuring wheels 71 and 72 may differ when the inclinometer 60 is upon a surface that is not flat.

Referring to FIG. 5, the front measuring wheel 71 cooperates with a sensor (designated generally by the numeral 75) which includes infrared reflector means, which may be a polished metal mirror 74, mounted on the inner surface thereof. The sensor 75 additionally includes an infrared light source 76 which directs a beam of light toward the front measuring wheel 71 so that the beam is incident upon the mirror 74 once in each revolution of the front measuring wheel 71. The mirror 74 directs the beam back into the light source 76, which in response produces a trigger signal. Thus, the circumference of the circle 73 defined by the rotating mirror 74 provides a convenient distance reference, or interval, between points at which height or slope measurements are made. If it is desired to make the measurements at intervals closer than the circumference of the circle defined by rotation of the mirror 74, the front measuring wheel 71 may include additional mirrors (not shown) preferably spaced equidistant apart along the circle.

Referring again to FIG. 3, the trolley houses a steering control mechanism 86, a computer 88, a battery 90 and a constant velocity D.C. servo drive motor 92 mounted inside the frame 20.

As shown in FIGS. 1 and 6, the trolley 10 includes a top 93 including therein a keyboard 94, a printer 96, a visual display 98 and a cavity 100 for holding a magnetic tape cartridge 102.

Figure 7:
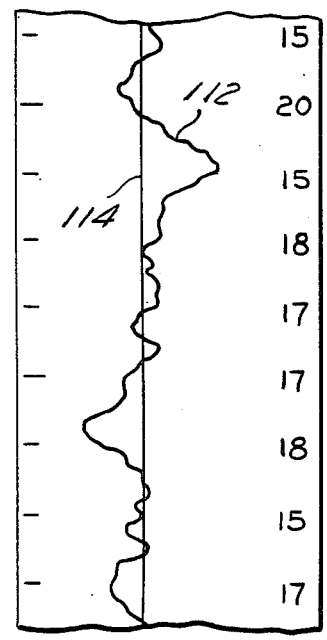
FIG. 7 is a graphical representation of variation in floor height output by the readout means of FIG. 6.
Figure 8:
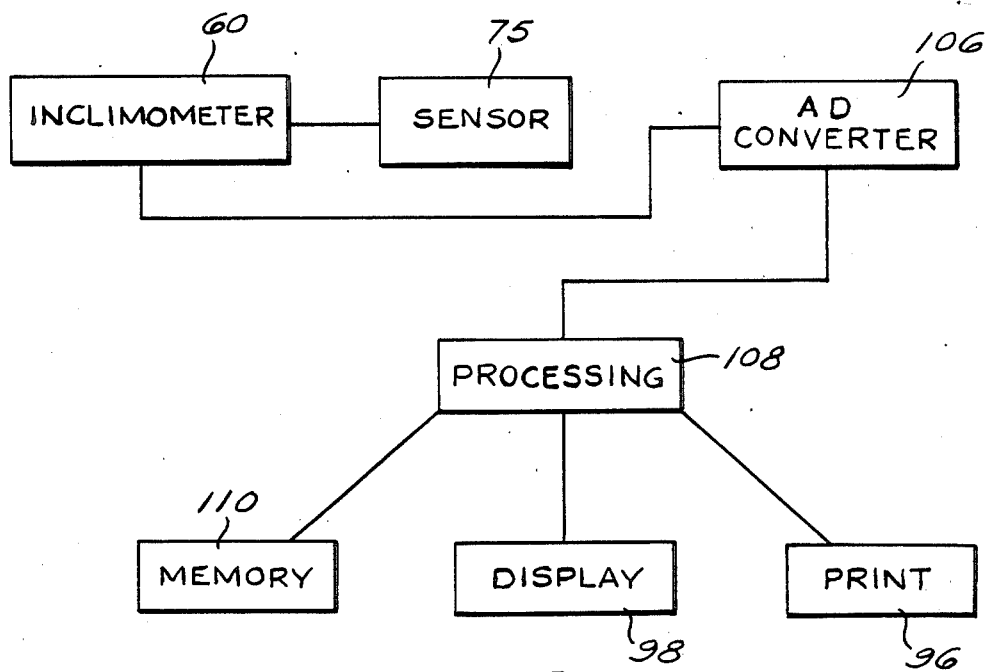
FIG. 8 is a functional block diagram of the invention.

The interconnections and operations of the various electronic components defined above are illustrated schematically in FIG. 8. As shown, the inclinometer 60 functions to provide an analog voltage signal in response to the sine of the angle of inclination between the measuring wheel 70 and 72. Upon activation or triggering of the sensor 75 at predetermined time or measurement intervals, i.e. upon detection of the beam by the photo detector 74, the inclinometer 60 outputs an analog signal to an analog to digital converter 106. The analog to digital converter 106 outputs digital signals to the computer 88, which includes a processing unit 108 and a memory unit 110. The processing unit 108 outputs command signals to the display 98 and to the printer 96. The printer 96 is preferably a dot matrix printer, which may conveniently print out a sequence of dots to represent the height profile of the floor 12 along the line 14. FIG. 7 illustrates a representative example of a trace 112 formed by the printer 96 as the trolley 10 traverses the floor 12. The trace 112 represents height variations from a predetermined reference line 114 as a function of the position of the trolley 10 along the reference line 114.

The inclinometer 60 measures the slope of the floor 12 at predetermined points. The computer 88 calculates the profile of the floor 12 along the line 14 relative to a selected reference level that is input into the computer 88. The computer 88 calculates and stores both the rate of slope change and the actual floor height as functions of distance at the locations selected for taking data. This floor data is relative to the start elevation unless the start elevation is known or measured through conventional surveying techniques. Additionally, the computer can calculate and store vertical acceleration data which is important to the productive operation of material handling equipment that will use the floor.

METHOD OF USE

In order to measure height variations in the floor 12, a user typically must align the sighting device 18 with the reference beam 14 generated by the optical source 16. The trolley 10 may then be positioned at a short distance upstream or prior to away from the point where actual measurements are desired because inclinometers 60 are typically sensitive to acceleration of the trolley 10 along the measurement path or beam 14. The drive motor 92 is activated and the trolley 10 set in motion to reach constant velocity before reaching the location of the first desired data point. The drive motor 92 and the drive mechanism 30 provide a constant velocity drive under normal conditions to prevent spurious outputs from the sensor 104. Throughout the measurement run, the steering control mechanism 86 serves to automatically make correctional movement of the trolley course along the reference beam 14.

The inclinometer 60 is calibrated by having the trolley 10 by making oppositely directed runs along essentially the same path to determine an offset factor. The trolley 10 next make measurement runs along a plurality of parallel paths on the floor 12. The trolley 10 is preferably started in motion such that the data points taken along the various paths produce a generally rectangular grid. As the measurement runs proceed, the computer 88 may either accumulate data in the memory 110 or in the magnetic tape cartridge 102. The data may be printed out by the printer 96 shortly after the computer 88 has processed the data signals input thereto or alternatively stored and printed out at the end of all measurement runs. As such, a true elevation profile representing the elevational difference between measurement points along the measurement path may be generated which profile may be digitally displayed, stored and/or plotted.

It has been found that large machine finished concrete floors tend to have a cross sectional profile which comprises of the sum of component sinusoidal shapes of many different wavelengths. The measuring wheels 71 and 72 should have a center-to-center spacing that is relatively small compared to the shortest sinusoidal component wave length of the floor surface profile in order to permit the sensor 104 to provide output signals that are true indications of the floor profile. If the distance between the axles 69 and 70 were approximately equal to an integral number of wave lengths, the measuring wheels 71 and 72 could be moving across a floor having a sinusoidal profile with unacceptably large undulations; and, yet, the inclinometer 60 would indicate no variations in floor heigh.

It has been found that mounting the axles 69 and 70 with a center-to-center spacing of about 3.5 inches is sufficient to ensure that the inclinometer output actually represents the profile of the floor 12.

The system and method of use described herein provide data sufficient to detect height variations of at least ⅛ inch in 10 feet of length, which permits satisfactory testing of floors for flatness for most industrial applications. If height variations greater than ⅛ inch in 10 feet are found, grinding equipment (not shown) is ordinarily used to grind down any high spots to achieve the desired floor profile.

What is claimed is:

1. A method for using an inclinometer mounted on a vehicle to measure the height profile relative to gravitational level of a path upon a floor surface comprising the steps of:
    determining a path along a floor surface;
    mounting an inclinometer upon a vehicle which moves along the path;
    calibrating the inclinometer, in order that an indicated level versus actual gravitational level of the inclinometer as mounted upon the vehicle may become known and corrected, by making oppositely directed runs of the vehicle along the path;
    moving the vehicle along the path to make measurements with the inclinometer of the slope of the floor relative to gravitational level along the path;
    sampling the slope measurements at predetermined intervals along the path; and
    processing the sampled slope measurements to determine the floor height profile along the path at the predetermined points relative to a gravitational level.

2. The method of claim 1 further comprising:
    moving the vehicle along the path at constant velocity.

3. The method of claim 1 further comprising:
    accumulating height profile data in order that a baseline height to which the floor height profile is processed may be offset by a constant which is substantially equal to the average height of the floor along the path.

4. The method of claim 1 further comprising:
    printing out the height profile data to form a graph of height profile as a function of distance along the path.

5. The method of claim 1 wherein the processing of the sampled slope measurements further comprises:
    printing out a graph to determine the vertical acceleration caused by the variations of the floor height as a function of distance along the path.

6. The method of claim 1 wherein the processing of the sampled slope measurements further comprises:
    printing out a graph to determine the true floor elevation relative to flat, as distinguished from differential elevations, as a function of distance along the path.

7. An apparatus for measuring surface heights relative to gravitational true level on a floor comprising:
    a vehicle for traversing along a predetermined path upon the floor;
    an inclinometer mounted to the vehicle which is calibrated for indicated vehicle level versus true gravitational level by oppositely directed movement of the vehicle along the predetermined path and which produces signals indicative of the angles of the floor profile relative to true gravitational level;
    distance measuring means for producing a signal indicative of the distance which the vehicle has traversed along the predetermined path; and
    computing means connected to the inclinometer for processing the signals indicative of the angles, and to the distance measuring means for processing the signals indicative of the distance in order to calculate the floor height profile along the predetermined path relative to true gravitational level.

8. An apparatus according to claim 7 wherein the vehicle comprises:
    a housing;
    a first measuring wheel and a second measuring wheel rotatably mounted to the housing, the first and second measuring wheels being positioned to roll upon the floor surface; and
    means for mounting the housing to the vehicle to permit the first and second measuring wheels to follow the profile of the floor as the vehicle traverses the floor.

9. An apparatus according to claim 7 wherein the distance measuring means is further comprising:
    signal means carried by the vehicle for producing at discrete intervals along the predetermined path that signal which is processed by the computing means.

10. An apparatus according to claim 9 wherein the signal means comprises:
    an infrared light source mounted on the inclinometer housing for directing a beam of infrared light against a side of the first measuring wheel; and
    infrared reflecting means mounted to the first measuring wheel to reflect the beam of infrared light back into the infrared light source as rotation of the first measuring wheel brings the infrared reflecting means in alignment with the infrared light source, the infrared light source including means responsive to the reflected infrared light from said infrared reflecting means to produce as the signal indicative of the distance which the vehicle means has traversed a trigger signal, the computing means being responsive to the trigger signal to sample the signal output from said sensing means.

11. An apparatus according to claim 7 further comprising:
    means for defining the path that the vehicle traverses along the floor.

12. An apparatus according to claim 11 wherein the means for defining the path comprises:
    a light beacon positioned upon the floor to produce a reference beam of light; and
    alignment means mounted to the vehicle for detecting the reference beam to indicate when the vehicle is aligned with the predetermined path.

13. An apparatus according to claim 8 wherein the inclinometer housing has freedom of movement vertically with the reference to the vehicle and is free to rotate in a plane parallel to the longitudinal axis of the vehicle but is constrained against rotation about lines perpendicular to the floor.

14. An apparatus according to claim 8 further comprising:
    a pair of steerable wheels mounted to the housing; and
    means for controlling the steerable wheels to guide the inclinometer along the reference path.

15. To a survey method of deriving the true relative elevations profile of a planar surface relative to local geophysical flat through defining a multiplicity of intersecting straight lines, normally forming a rectangular grid, upon the planar surface, measuring the heights, relative to a gravitational true level line of arbitary height, of the intersection points along each of the intersecting straight lines, and correlating the measured heights of the intersection points until the true elevations profile of the planar surface relative to true gravitational flat is known at each of the intersection points relative to all other of the intersection points, an improvement to the measuring of heights relative to an arbitary height gravitational true level line, said improvement comprising:

affixing an inclinometer, which indicates inclination angle relative to gravitational true level, to a vehicle, calibrating the inclinometer as affixed to the vehicle for its indicated level indication versus a gravitational true level of the vehicle by, moving the vehicle bidirectionally along a path between substantially level end points upon a planar surface, sampling the inclination angle indicated by the inclinometer at predetermined points along the path, processing the sampled inclination angles to determine an apparent floor height profile along the path and between the substantially level end points, and determining inclinometer calibration as the slope of the apparent floor height profile versus displacement along the path, sampling the calibrated inclination angles relative to gravitational true level indicated by the calibrated inclinometer at predetermined points along the path processing the sampled calibrated inclination angles in order to derive heights relative to the gravitational true level along the line of the path.

\* \* \* \* \*